(No Model.) 5 Sheets—Sheet 1.
P. P. WENZ
TYPE WRITING MACHINE.

No. 491,730. Patented Feb. 14, 1893.

WITNESSES.
E. Byron Gilchrist
Wm. H. Forker.

INVENTOR
Philip P. Wenz.
By Leggett & Leggett
attorneys (No Model.) 5 Sheets—Sheet 2.
P. P. WENZ
TYPE WRITING MACHINE.

No. 491,730. Patented Feb. 14, 1893.

Witnesses. Inventor.

(No Model.) 5 Sheets—Sheet 3.
P. P. WENZ
TYPE WRITING MACHINE.

No. 491,730. Patented Feb. 14, 1893.

Witnesses.
E. Byron Gilchrist
Wm. H. Forker.

Inventor.
Philip P. Wenz
By Leggett & Leggett
Attorneys.

(No Model.)     5 Sheets—Sheet 4.
P. P. WENZ
TYPE WRITING MACHINE.
No. 491,730.     Patented Feb. 14, 1893.
Fig. 5.
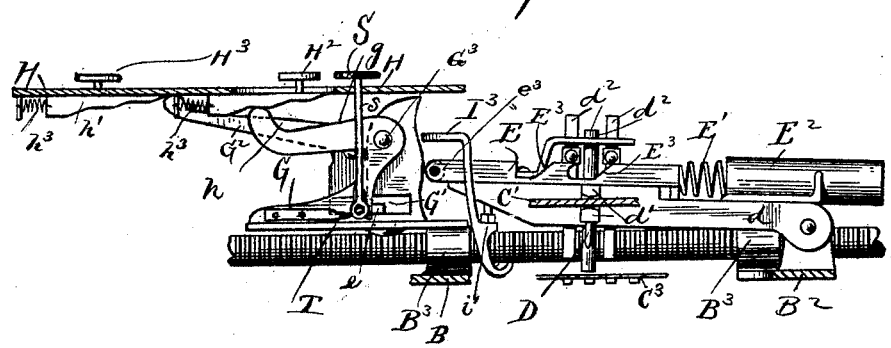
Fig. 6.
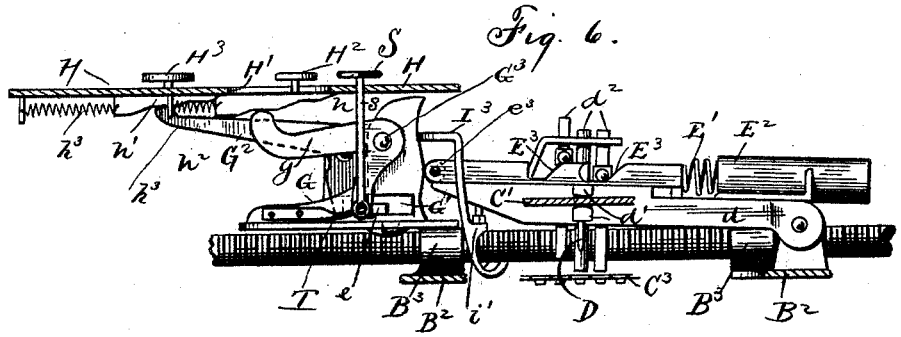
Fig. 7.
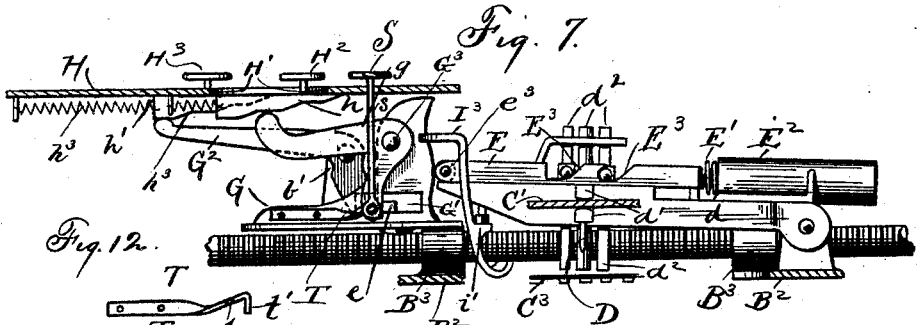
Fig. 12.
Fig. 13.
Witnesses.
E. Byrm Gilchrist
Wm. H. Crorker
Inventor.
Philip P Wenz.
By Leggett & Leggett.
Attorneys (No Model.) 5 Sheets—Sheet 5.

P. P. WENZ
TYPE WRITING MACHINE.

No. 491,730. Patented Feb. 14, 1893.

Witnesses:
E. Bryan Gilchrist
Wm. H. Forker

Inventor
Philip P. Wenz
By Leggett & Leggett
Attorneys.

UNITED STATES PATENT OFFICE.

PHILIP P. WENZ, OF MEADVILLE, PENNSYLVANIA.

TYPE-WRITING MACHINE.

SPECIFICATION forming part of Letters Patent No. 491,730, dated February 14, 1893.

Application filed August 22, 1891. Serial No. 403,448. (No model.)

*To all whom it may concern:*

Be it known that I, PHILIP P. WENZ, of Meadville, in the county of Crawford and State of Pennsylvania, have invented certain new and useful Improvements in Type-Writing Machines; and I do hereby declare the following to be a full, clear, and exact description of the invention, such as will enable others skilled in the art to which it pertains to make and use the same.

My invention relates to improvements in type-writing machines, and is designed as an improvement on a device for which United States Letters Patent No. 438,965 were granted to me October 21, 1890.

Figure 1:
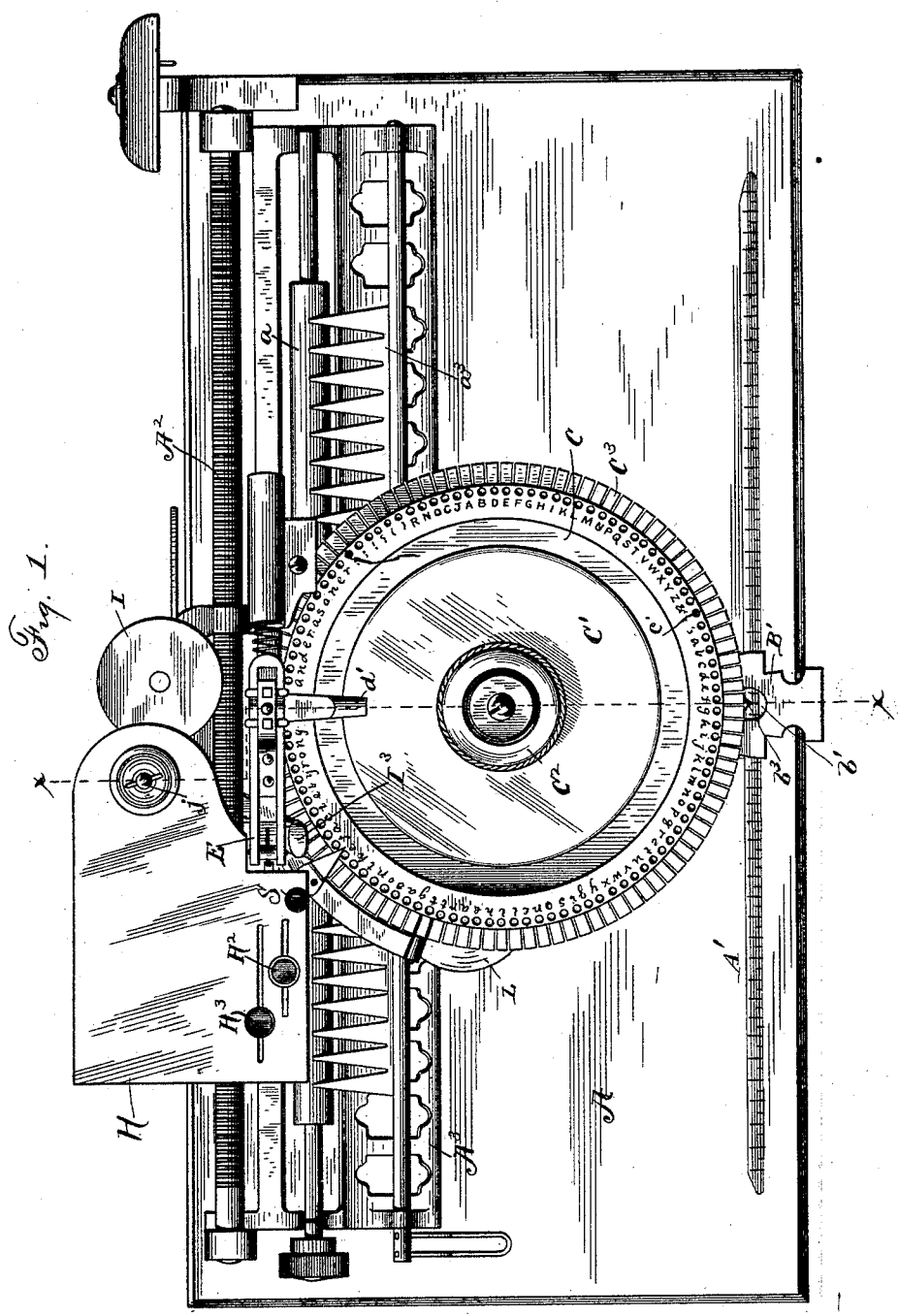
Figure 2:
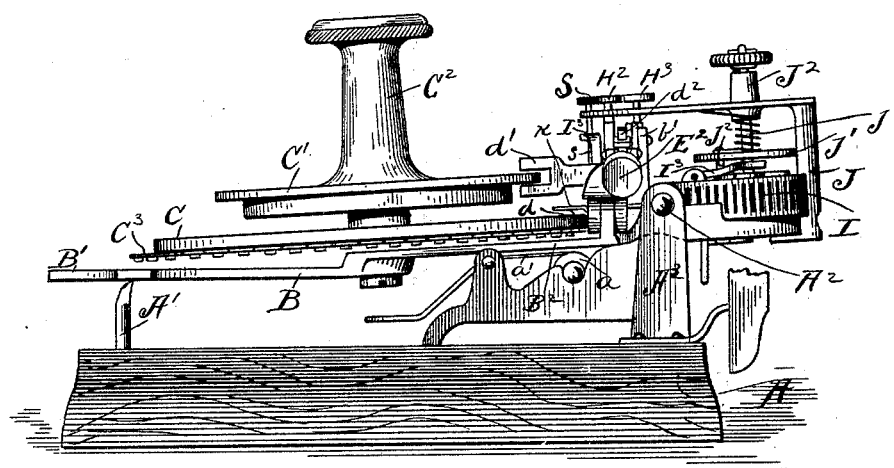
Figure 3:
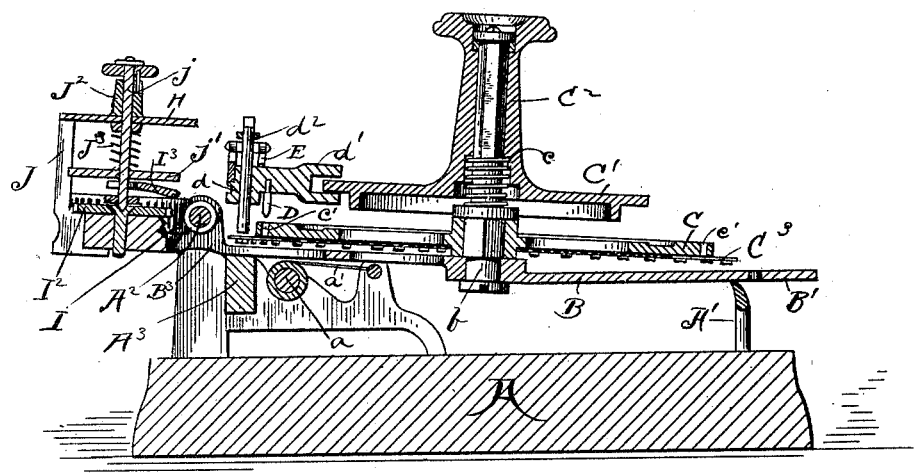
Figure 4:
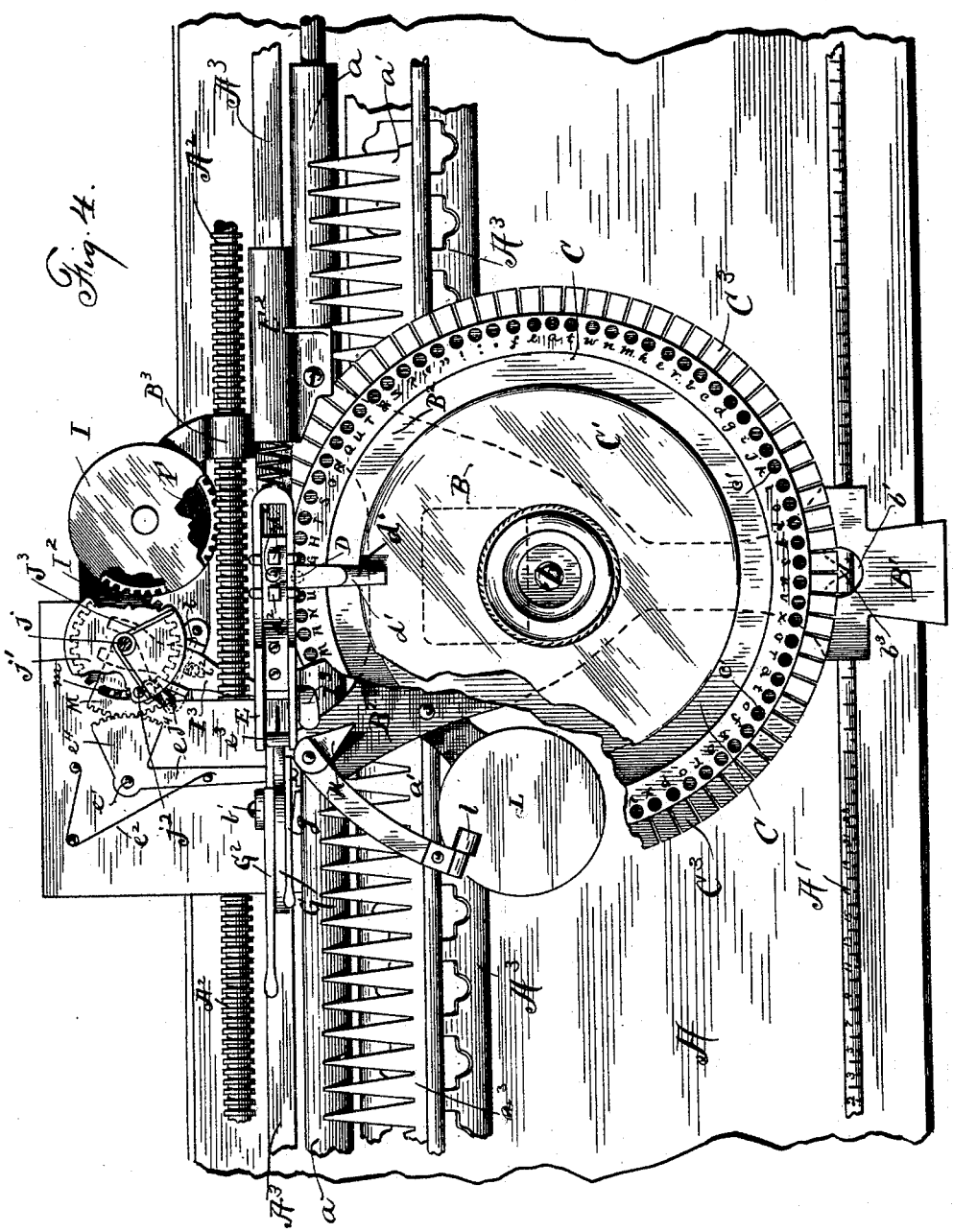
Figure 9:
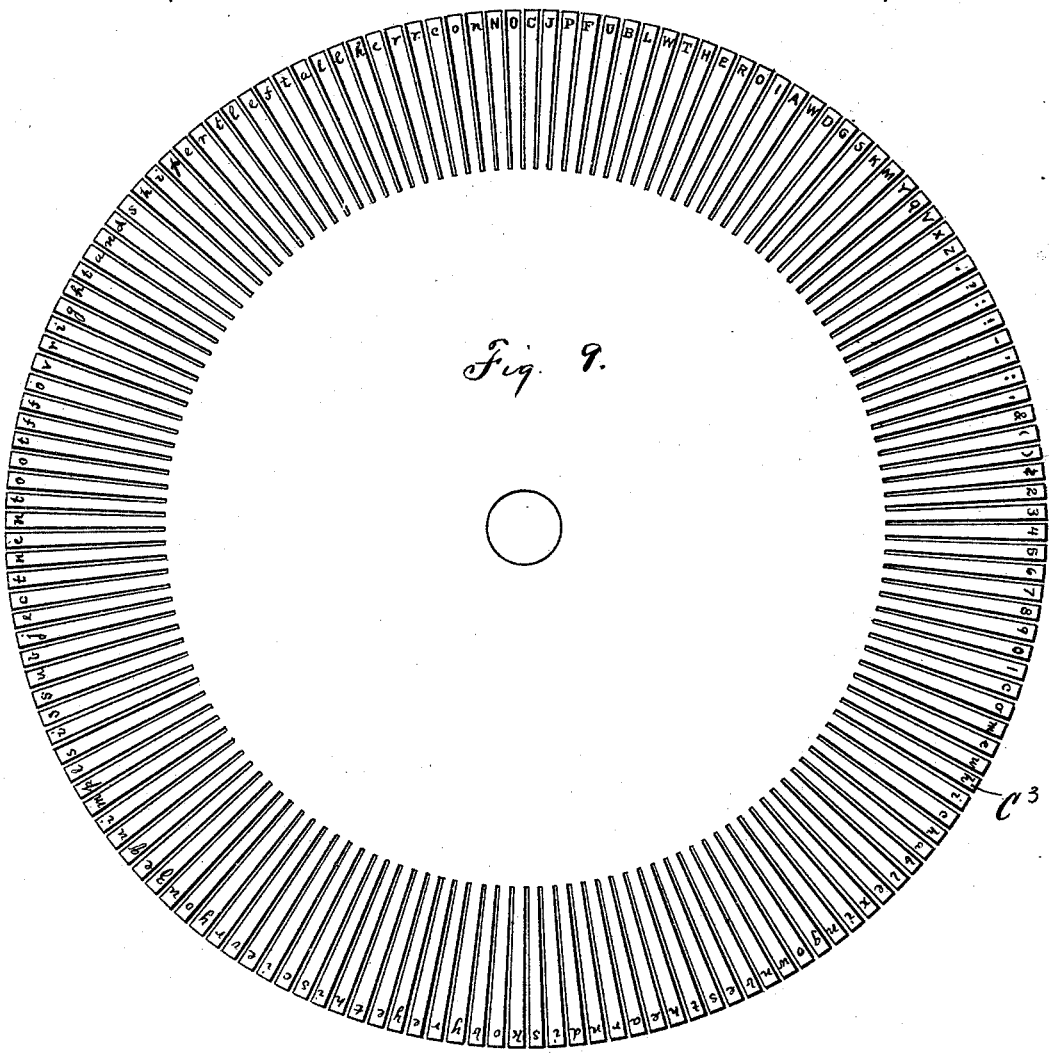
Figure 10:
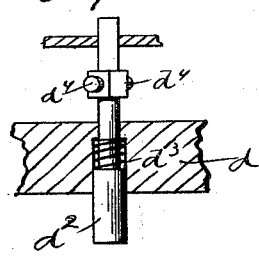
Figure 8:
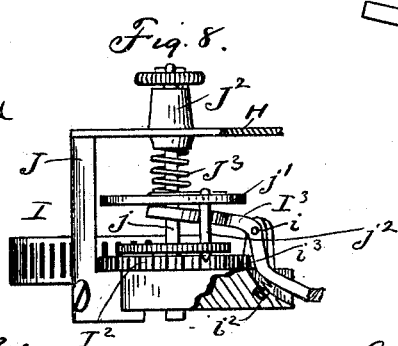
Figure 11:
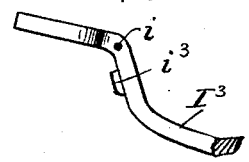

In the accompanying drawings, Figure 1 is a plan of a machine embodying my invention. Fig. 2 is a right hand end elevation. Fig. 3 is an elevation in transverse section taken on the irregular line $x$ $x$, Fig. 1, looking toward the right hand. Fig. 4 is an enlarged plan of the central portion of the machine, portions being broken away or sectioned to show the internal construction. Figs. 5, 6 and 7 are enlarged side elevations of the hammer-mechanism in detail, showing different working positions. Fig. 8 is an enlarged elevation of the escapement mechanism in detail. Fig. 9 is an enlarged bottom plan of the type-wheel detached. Fig 10 is an elevation, partly in section, in detail, of a loose type-hammer. Fig. 11 is an enlarged side elevation in detail of lever 13. Figs. 12 and 13 are, respectively, a plan and front side elevation of spring T detached.

A represents the base of the machine, upon which is mounted a graduated scale-bar A' and the rack-feed-bar A² and the frame A³, the latter supporting the paper feed-roll $a$ and paper clamp $a'$.

B is a tilting-frame having a lifting handle B' in front. This frame in front rests and slides on bar A'. Referring to Fig. 4 it will be seen that handle B' has an opening $b^2$ through which opening bar A' can be seen. This opening is preferably heart-shaped in which case point $b^3$ serves as a pointer and indicates on the scale of the bar A' the position of the paper relative to the place where the printing is done.

Frame A at the rear has arms B² B², these arms terminating in sleeves B³ that embrace, with an easy fit, rack-bar A², the latter being a round rod with the teeth thereof extending circumferentially around the rod so that the teeth may be engaged from either side of the rod.

Frame B is moved automatically from left to right in printing and is reversed by hand after the printing of a line, and by tilting the frame upward the printing can be inspected. This frame has a hub in the vertical bore of of which is journaled spindle $b$. This spindle above the journal bearing thereof is preferably square, or of such angular form in cross section that plates C and C', that are mounted on the latter with an easy fit on the spindle, will revolve with the spindle, although plate C' may be reciprocated lengthwise the spindle. Plate C' has a hub C² projecting above the spindle, the upper end of hub C² serving as a thumb-piece for depressing plate C', the latter being held in its normal position by a spring $c$ interposed between the two plates C C', the former serving as the type-wheel.

The bottom of the type-wheel C is provided with a metal disk C³, this disk being slitted at the periphery to form a series of elastic arms projecting beyond the periphery of wheel C and carrying the type on the under side thereof. Disk C has a series of small holes $c'$ arranged in circular order above the type for engaging the type centering-pin D. Plate C, on the top surface thereof, and adjacent these perforations, is provided with letters, figures or characters corresponding with the type below. Pin D is fastened to end and depends from under side of arm $d'$, the arrangement being such that in rotating disk C the perforations move under pin D, and by depressing this pin to cause it to enter one of the perforations the corresponding type is held in position for printing. The type-hammers and feed-mechanism are constructed as follows:

An impression lever $d$ is preferably hinged at the one end thereof to a lug connected with the right hand arm B², this impression lever having rigidly attached a laterally-projecting forked arm $d'$, the prongs whereof pass astride the edge of disk C', whereby this lever and attachments are actuated by the up-and-down movements of this disk. The type-hammers $d^2$, of which there may be any number desired, in the present instance three, are mounted on the impression-lever, one of these hammers, in the present instance, the central hammer, being rigidly attached to this lever, so that this fixed hammer is always in operative position for printing. The other loose hammers are operative or inoperative according as they are in their depressed or elevated position relative to the impression-lever, these loose hammers having easy fits in vertical holes in lever $d$, each loose hammer having a spring $d^3$ arranged as shown in Fig. 10 for depressing the hammer, each loose hammer having a lateral pin $d^4$ projecting preferably on either side of the hammer. On top of lever $d$ is mounted a sliding bar E operative endwise the lever and will hereinafter be mentioned as the slide. This slide has a slot or vertical mortise through which the different hammers extend loosely, and the side walls of such mortise have notches or inclines $E^3$ for respectively engaging the pins of each loose hammer, the arrangement being such that with the slide at the end of its throw toward the left hand all of the loose hammers are raised against the action of their springs to their elevated and consequently inoperative position; that is to say, these elevated hammers, with the depression of lever $d$, would not engage the type-levers.

The arrangement of inclines on the slide is such that by moving the slide toward the right hand one step at a time, first, one and then another of the loose hammers are successively released and depressed by the action of their springs to an operative position for printing, and it follows that the reverse movement of the slide caused by the recoil of spring $E'$ will successively elevate the different loose hammers and render them inoperative. The one end of spring $E'$ engages the right hand end of the slide, and the other end of this spring is secured in sleeve $E^2$, this sleeve being rigidly connected with lever $d$. When a loose hammer is in its depressed position the tension of its spring $d^3$ is sufficient to cause the hammer to deliver a blow of sufficient force on the opposing type-lever for printing whenever lever $d$ is depressed by hand through the medium of disk $C'$ and its hub or thumb-piece. It will be seen therefore that the depression of disk $C'$ and the consequent depression of lever $d$ will only print one letter or character at a time except the loose hammer or hammers are first lowered, by the movement of slide E toward the right hand. And this slide is moved more or less in this direction against the action of spring $E'$ according as one or more loose hammers are to be used at the time.

For moving the slide E toward the right hand and more or less according to the number of loose hammers to be brought into action the following mechanism is provided, to wit: A horizontal bell-crank lever $e$ rests upon and is pivoted at the elbow thereof to frame B at $e'$, this lever having a spring $e^2$ for reversing the lever, that is, for moving the forwardly-projecting arm thereof toward the left hand. The forward end of lever $e$ operates in a slot $G'$ of an upright bracket or knee G, and by the action of springs $e^2$ the lever always engages the left hand end wall of slot $G'$, except as hereinafter mentioned. This knee, when moved toward the right hand, engages a friction roller $e^3$ of slide E, and thereby moves the slide in the same direction, more or less, of course, according to the movement of the knee. Frame B has an upwardly-projecting lug $b'$ to which is pivoted a bell-crank-lever $G^2$, the depending arm of this lever engaging the left hand face of a shoulder or lateral projection of knee G, the lateral arm of lever $G^2$ extending toward the left hand, and by depressing this lateral arm, knee G, slide E and lever $e$ are simultaneously moved toward the right hand. To knee G is pivoted at $G^3$ another bell-crank lever $g$, the depending arm of the latter engaging the left hand side of lever $e$ where the lever protrudes in front through the slot in the knee. The lateral arm of lever $g$ extends toward the left hand by the side of the lateral arm of lever $G^2$ and by depressing the lateral arm of lever $g$ lever $e$ is actuated without moving knee G and hence, without moving the slide E, and this is done to cause larger spaces between the letters, characters or words. Levers $G^2$ and $g$ are not actuated directly by the fingers of the operator, but for this purpose is provided a plate or small table H supported from frame B, this plate having two slots $H'$ extending crosswise the machine and located side by side, over two the bell-crank levers below. In each of these slots operates a vertical pin, each pin next above the table having attached a finger-piece respectively, $H^2$ and $H^3$, and the lower end of these pins have attached inclines or wedges respectively $h$ and $h'$. When member $H^2$ is moved toward the left hand the connected wedge $h$ depresses lever $g$, thereby causing a longer space between next adjacent letters, characters or words; that is to say, the frame is fed along toward the right hand farther than it otherwise would be. When member $H^3$ is moved toward the left hand its connected wedge $h'$ depresses lever $G^2$ and thereby actuates slide E, causing a loose hammer to be depressed, (but this wedge $h'$ has two steps,) and when this wedge is advanced one step slide E is thereby actuated just far enough to depress one loose hammer. If member $H^3$ is moved farther so that the second stop $h^2$ of the wedge engages the lever, slide E will have been actuated far enough to depress two loose hammers and this wedge might have any number of steps to correspond with the number of loose hammers employed. Each finger-piece $H^2$ $H^3$ has a spring $h^3$ for reversing the same. The short lateral arm of lever $e$ terminates in a toothed sector $e^4$, the teeth whereof engage the teeth of a segmental gear or plate M. Member M is located next above and has a common axis with wheel I² hereinafter described. Member M has a curved slot m located over the line of the teeth of wheel I². I is a short upright hollow cylinder known as a barrel, journaled on an upright pin connected with frame B. The periphery of this barrel is grooved and toothed to engage feed-bar A². Inside this barrel is a coil spring I' known as the barrel-spring. This spring is wound up in moving frame B by hand toward the left hand and the recoil of this spring moves the frame toward the right hand in printing subject to the control of an escapement hereinafter described. The teeth of barrel I also engage the teeth of wheel I², the latter serving as the escapement-wheel.

J is a standard or post connected with frame B, the upper end of the post overhanging wheel I² where it joins plate H and has a hub J², the latter being pierced vertically and in line with the center of wheel I². Through the bore of this hub operates a spindle $j$ having a thumb-nut above the hub for adjusting the spindle lengthwise and for elevating the spindle by hand when necessary. This spindle below has rigidly attached disk $j'$ and between this disk and plate H is a spring $J^3$ coiled around the spindle and engaging the disks and plates, so that the action of this spring on the spindle is downward and rearward. The spindle and disk $j'$ may revolve on their common axis. Disk $j'$ has a depending pin $j^2$, this pin with the depression of the spindle being adapted to enter between the teeth of the escapement-wheel I², the lower end of this pin being usually pointed for the purpose. What might be called a hair-spring $J^3$ engages this pin, the action of this spring on the pin being rearward and downward, that is to say, in the reverse direction from that the adjacent teeth of the wheel I² move in feeding frame B toward the right hand in printing. Pin $j^2$, as it moves forward by the action of the barrel-spring, engages a stop $j^4$ and the pin as it is moved rearward by the action of spring $j^3$, is stopped by engaging the rear end wall of slot m. This pin then can play in slot m a distance equal to one, two, three or more teeth according to the position of member M resultant on the operation of lever e according as the lever has been used for bringing one, two, three or more hammers into play, and as lever e and slide E are not moved in bringing the stationary hammer into use the arrangement is such that there is always room between lever e and stop $j^4$ for pin $j^2$ to move the distance of one tooth. There is a crooked lever I³ pivoted at $i$. From the pivot this lever leads downward past the periphery of wheel I², and from thence extends forward under the line of the impression lever d where lever I³ is provided with an abutment or contact-point $i'$ for engaging lever d. Thence lever I³ extends upward and then toward the left hand, terminating in a finger-piece. Lever I³ on the other side of its fulcrum extends rearward under disk $j'$, this end of the lever being forked and the prongs thereof extending astride spindle $j$. Lever I³ is provided with a spring $i^2$ for elevating the forward end of this lever, and opposite wheel I² lever I³ is provided with a dog $i^3$ for engaging the teeth of the opposing wheel I². Whenever the forward end of lever I³ is depressed. Now, to move the carriage from left to right without printing, lever I³ is depressed by the operator. This elevates pin $j^2$ above wheel I² and at the same time dogs this wheel, whereupon spring $j^3$ moves pin $j^2$ rearward one notch, whereupon the pin is stopped by its engagement with the end of slot m. With the reverse movement of lever I³ wheel I² is undogged and pin $j^2$ entering between the teeth of wheel I², the wheel and pin are moved together by the action of the barrel-spring, thus moving frame B and attachments one space toward the right hand, and this occurs in printing each letter or character by means of lever I² being actuated by the depression of the impression lever. If, however, one or more of the loose hammers are brought into action this will of course be done by shifting slide E and lever e, in which case when pin $j^2$ moves rearward it will engage the second or third tooth rearward on wheel I² according to the position of lever e, after which the action of barrel-spring will rotate wheel I² one, two or three teeth, as the case may be, until the pin engages stop $j^4$. In reversing frame B for commencing a new line spindle $j$ by means of a thumb-nut on top is elevated by hand to raise pin $j^2$ above wheel I², after which frame B is moved to the left hand by the operator ready for printing another line. In addition to feeding the frame to separate the letters so that they be not printed one on top of the other the frame must be fed to give the necessary spaces between the words, and this is done by the operator moving member H². By depressing lever g lever e is thrown back the distance of one tooth of the escapement-wheel farther than it would otherwise have been, thus causing a correspondingly longer space to be left in printing. The types are arranged on the type-wheel singly and in groups as described in my former patent, but I now use a larger type-wheel than formerly, thus making room for more groups and combinations of letters, syllables and even short words that are frequently used.

K is a pointer that indicates on the letters on the top surface of disk C whereby the disk is turned so that the desired type is brought into position for printing.

L is the inking-plate on which operates the inking-roller $l$, this roller being in position to engage the face of the type as wheel C is rotated to bring the different type in position for printing, this roller distributing the ink from the plate to the type.

T is a slight spring attached to the side of knee G, member T having a laterally-projecting pin or teat $t$ for pivotally attaching shank *s* of key S. Shank *s* fits loosely in a hole in table H, so that this shank can vibrate for enough to accommodate the movement of knee G. This spring is bent downward as at *t'* to form an abutment for engaging levers *e* aforesaid whenever spring T is in its normal or elevated position. By depressing spring T by means of key S this spring is forced below the plane of and hence does not engage lever *e*. Whenever therefore spring T is depressed lever *e* engages the left hand end wall of slot G', and under such conditions lever *e* would be moved toward the right hand with the similar movement of knee G. Now, if lever *e* were moved one space toward the right hand so as to be on the right hand of spring T, under such conditions lever *e* would be moved toward the right hand with the movement of the knee. When key S is depressed and lever *e* rests on the end wall of slot G' the rear end of lever *g* will retire with it and when necessary to place lever *e* in its normal position the depression of the upper end of lever *g* will push lever *e* over the abutment of spring T. But if while moving knee G say three spaces toward the right hand, key S were depressed, in such case lever *e* would lag behind one or more spaces. If, therefore, it is desired at one operation to print a part of a word, say comprising three letters and requiring only two spaces, in such case member H³ is moved three spaces, meanwhile spring T is depressed whereby the spacing mechanism is only actuated two spaces.

What I claim is—

1. In a type-writing machine, in combination, a tilting and sliding-frame bearing the type-wheel and bearing a barrel-wheel provided with a barrel-spring, the barrel-wheel engaging the feed-bar and engaging an escapement-wheel, the barrel-spring being adapted to feed the frame in one direction, one or more spaces the spring being wound up in reversing the frame by hand, substantially as set forth.

2. In combination, a sliding and tilting-frame having a spindle, a type-wheel and disk mounted on and the latter adapted to reciprocate lengthwise such spindle, the spindle being of such form in cross section as will cause the type-wheel and disk to revolve with the spindle, substantially as set forth.

3. In combination, a tilting and sliding-frame having an angular spindle, a type-wheel and disk mounted on the spindle said disk having an angular central opening adapted to receive the spindle so that the disk may reciprocate on and both may turn with the spindle, a spring interposed between the type-wheel and disk for elevating the latter, such disk having a hub serving as a thumb-piece in depressing the disk and in revolving the spindle and attachments, substantially as set forth.

4. In combination, a feed-bar, a rotating type-wheel and disk, an impression lever bearing the type-hammers, a slide mounted on such lever and having incline engaging projecting members of the loose hammers for elevating the hammers successively to their inoperative position, substantially as set forth.

5. In combination, an impression-lever bearing fixed and loose hammers, and bearing a slide for elevating the loose hammers against the action of their springs, a sliding-knee for actuating the slide, a bell-crank-lever for actuating the knee and means for actuating the lever by hand, substantially as set forth.

6. In combination, an impression-lever bearing hammers and slide substantially as indicated, a bracket or knee for operating the slide, a bell-crank-lever for operating the knee, finger-pieces bearing wedges, such wedges having one or more steps for depressing the lever one or more steps according to the movement of the finger-piece, substantially as set forth.

7. In combination, a barrel-wheel and inclosed spring, the teeth of the barrel-wheel engaging an escapement-wheel, a dog for locking the escapement-wheel, a reciprocating-pin adapted to engage the teeth of the escapement-wheel and acting on the wheel alternately with the dog, a fixed and movable stop for regulating the swinging movement of the pin thereby controlling the movement of the escapement-wheel, substantially as set forth.

8. In combination, an escapement-wheel, a rotating and reciprocating spindle having a common axis with the wheel, such spindle having attached a disk bearing a depending pin adapted to engage the teeth of such wheel in depressing the spindle, a spring for rotating the spindle in the opposite direction to the feeding movement of the wheel, a fixed and movable stop for limiting the swinging movement of the pin, substantially as set forth.

9. In combination, an escapement-wheel, reciprocating and rotating spindle bearing a pin for engaging the teeth of the wheel, substantially as indicated, a fixed and a movable stop for limiting the swinging movement of the pin, the movable stop being operatively connected with mechanism for lowering one or more hammers into operative positions, substantially as set forth.

10. In combination, an escapement-wheel, a pin adapted to engage the teeth of such wheel, fixed and movable stops for controlling the swinging movement of the pin, a lever for elevating the pin, such lever bearing a dog for engaging the escapement-wheel alternately with the engagement of the pin, such lever having a thumb-piece and having an abutment in position for engaging the impression-lever with the depression of the latter, substantially as set forth.

11. The combination, with the type-disk and type substantially as indicated, of an inking-plate over which the outer edge of the disk moves and an inking-roller operative on the plate, the roller being in position to engage the face of the passing type, substantially as set forth.

12. In combination, lever $e$, knee G and the spacing mechanism substantially as indicated, of a depressible spring connected with the knee, such spring in its elevated position forming an abutment for lever $e$ for holding the lever one or more spaces in advance, a key for depressing such spring, the parts being arranged substantially as and for the purpose set forth.

In testimony whereof I sign this specification, in the presence of two witnesses, this 20th day of July, 1891.

PHILIP P. WENZ.

Witnesses:
D. H. BOYD,
OTTO KOHLER.